US012060955B2

(12) United States Patent
Giannakopoulos et al.

(10) Patent No.: US 12,060,955 B2
(45) Date of Patent: Aug. 13, 2024

(54) COMPOSITE CONNECTORS AND METHODS OF MANUFACTURING THE SAME

(71) Applicant: Crompton Technology Group Limited, Solihull (GB)

(72) Inventors: Ioannis Giannakopoulos, London (GB); James William Bernard, Brackley (GB); Alexander D. Taylor, Exeter (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 1136 days.

(21) Appl. No.: 16/536,344

(22) Filed: Aug. 9, 2019

(65) Prior Publication Data

US 2020/0049282 A1    Feb. 13, 2020

(30) Foreign Application Priority Data

Aug. 10, 2018 (EP) ..................... 18386024

(51) Int. Cl.
*F16L 23/032* (2006.01)
*B29C 70/48* (2006.01)
(Continued)

(52) U.S. Cl.
CPC ............ *F16L 23/032* (2013.01); *B29C 70/48* (2013.01); *F16L 47/14* (2013.01); *B29K 2101/10* (2013.01);
(Continued)

(58) Field of Classification Search
CPC ......... F16L 23/032; F16L 47/14; F16L 9/128; F16L 57/06; F16L 5/08; F16L 41/086
See application file for complete search history.

(56) References Cited

U.S. PATENT DOCUMENTS 746,648 A    12/1903  Tippett
3,156,489 A  11/1964  Deringer
(Continued)

FOREIGN PATENT DOCUMENTS

CN    2502105 Y      7/2002
CN    102278342 A   12/2011
(Continued)

OTHER PUBLICATIONS

Abstract for DE102013005649 (A1), Published: Oct. 2, 2014, 1 page.

(Continued)

*Primary Examiner* — Matthew Troutman
*Assistant Examiner* — Fannie C Kee
(74) *Attorney, Agent, or Firm* — CANTOR COLBURN LLP

(57) ABSTRACT

A method of manufacturing a connector for a fluid transfer conduit comprises: providing a first mould section comprising a hub-moulding portion which extends substantially parallel to a central axis C and a flange-moulding portion which extends from the hub-moulding portion at an angle to the central axis C; introducing fiber-reinforcement to the first mould section such that continuous circumferentially-oriented fiber-reinforcement lies in the hub-moulding portion, and continuous longitudinally-oriented fiber reinforcement extends from the hub-moulding portion into the flange-moulding portion; applying a second mould section over the first mould section to form a complete mould in which the fiber-reinforcement is confined; and introducing a polymer to the complete mould such that it permeates through the fiber-reinforcement to form a fiber-reinforced polymer connector; and extracting the connector from the mould.

11 Claims, 7 Drawing Sheets

(51) Int. Cl.
  *F16L 47/14*    (2006.01)
  *B29K 101/10*   (2006.01)
  *B29K 105/08*   (2006.01)
  *B29K 307/04*   (2006.01)
  *B29L 31/24*    (2006.01)

(52) U.S. Cl.
  CPC .. *B29K 2105/0845* (2013.01); *B29K 2307/04* (2013.01); *B29L 2031/24* (2013.01)

(56)         References Cited

U.S. PATENT DOCUMENTS

| | | | |
|---|---|---|---|
| 3,224,795 | A | 12/1965 | Conley |
| 3,537,484 | A * | 11/1970 | McLarty ................. F16L 9/133 138/144 |
| 3,651,661 | A * | 3/1972 | Darrow ................... F16C 3/026 464/181 |
| 3,899,006 | A * | 8/1975 | Champleboux ......... F16L 47/14 138/109 |
| 3,920,049 | A | 11/1975 | Lippert et al. |
| 4,217,935 | A | 8/1980 | Grendelman et al. |
| 4,225,158 | A * | 9/1980 | Puechavy ............... F16L 33/28 285/55 |
| 4,256,790 | A | 3/1981 | Lackman et al. |
| 4,330,016 | A | 5/1982 | Grendelman |
| 4,511,423 | A | 4/1985 | Magarian et al. |
| 4,622,091 | A | 11/1986 | Letterman |
| 4,702,498 | A | 10/1987 | Mueller et al. |
| 4,813,457 | A | 3/1989 | Offringa et al. |
| 4,846,908 | A * | 7/1989 | Aldrich ................... B29C 70/48 156/149 |
| 4,980,006 | A | 12/1990 | Bordner |
| 5,106,130 | A | 4/1992 | Ellsworth et al. |
| 5,110,644 | A | 5/1992 | Sparks et al. |
| 5,135,596 | A | 8/1992 | Pabsch et al. |
| 5,397,272 | A | 3/1995 | Smiley et al. |
| 5,685,933 | A | 11/1997 | Ohta et al. |
| 6,251,332 | B1 | 6/2001 | Nakagawa et al. |
| 6,361,080 | B1 | 3/2002 | Walsh et al. |
| 7,138,167 | B2 | 11/2006 | Sakonjo et al. |
| 8,424,921 | B2 | 4/2013 | Marlin et al. |
| 8,491,740 | B2 | 7/2013 | Serey et al. |
| 8,800,605 | B2 | 8/2014 | Barlow et al. |
| 8,813,335 | B2 | 8/2014 | Geislinger et al. |
| 8,899,274 | B1 | 12/2014 | Grosch |
| 9,140,140 | B2 | 9/2015 | McMillan |
| 9,222,605 | B2 | 12/2015 | Ciolczyk et al. |
| 9,482,266 | B2 | 11/2016 | Dewhirst |
| 9,731,453 | B2 | 8/2017 | Humfeld et al. |
| 9,897,122 | B2 | 2/2018 | Luce |
| 9,937,671 | B2 | 4/2018 | Larson |
| 10,539,174 | B2 | 1/2020 | Gurvich et al. |
| 2003/0193194 | A1* | 10/2003 | Sadr ....................... F16L 23/032 285/405 |
| 2009/0200700 | A1 | 8/2009 | Marlin et al. |
| 2009/0243284 | A1 | 10/2009 | Klingel, Jr. et al. |
| 2010/0122749 | A1 | 5/2010 | Bouleti et al. |
| 2011/0192528 | A1* | 8/2011 | Kozaki ................... B29C 70/48 156/173 |
| 2012/0057267 | A1 | 3/2012 | Petit et al. |
| 2013/0236664 | A1 | 9/2013 | Tsotsis |
| 2013/0266431 | A1 | 10/2013 | Moram et al. |
| 2014/0138947 | A1* | 5/2014 | Palsson .................. F16L 47/14 285/293.1 |
| 2014/0309042 | A1 | 10/2014 | Chase et al. |
| 2015/0176732 | A1 | 6/2015 | Courpet et al. |
| 2015/0299913 | A1 | 10/2015 | Hori et al. |
| 2015/0343716 | A1* | 12/2015 | Feeney ................... B29C 70/48 425/500 |
| 2016/0273696 | A1 | 9/2016 | Hutchinson |
| 2016/0356403 | A1 | 12/2016 | Perrigo et al. |
| 2017/0191618 | A1* | 7/2017 | Kloft ....................... B29C 70/48 |
| 2017/0198734 | A1 | 7/2017 | Bernard et al. |
| 2017/0227058 | A1* | 8/2017 | Pollitt ..................... B29C 70/48 |
| 2020/0049180 | A1 | 2/2020 | Pollitt |
| 2020/0049181 | A1 | 2/2020 | Pethick |
| 2020/0049182 | A1 | 2/2020 | Bernard et al. |
| 2020/0049283 | A1 | 2/2020 | Chase et al. |
| 2020/0049284 | A1 | 2/2020 | Pollitt et al. |
| 2020/0049296 | A1 | 2/2020 | Giannakopoulos et al. |
| 2020/0316830 | A1 | 10/2020 | Bernard et al. |
| 2021/0069937 | A1 | 3/2021 | Peterson |
| 2023/0160505 | A1 | 5/2023 | Pollitt et al. |
| 2024/0009942 | A1 | 1/2024 | Pethick |

FOREIGN PATENT DOCUMENTS

| | | | |
|---|---|---|---|
| CN | 106015302 | A | 10/2016 |
| CN | 206840761 | U | 1/2018 |
| CN | 108268692 | A | 7/2018 |
| DE | 19834772 | A1 | 2/2000 |
| DE | 19906618 | A1 | 8/2000 |
| DE | 102008033577 | A1 | 1/2010 |
| DE | 102011077287 | A1 | 12/2012 |
| DE | 102013005649 | A1 | 10/2014 |
| DE | 102014004157 | A1 | 9/2015 |
| EP | 1324092 | A1 | 7/2003 |
| EP | 1859958 | B1 | 9/2010 |
| EP | 3332946 | A1 | 6/2018 |
| FR | 2706574 | A1 | 12/1994 |
| GB | 1222041 | A | 2/1971 |
| GB | 2033992 | A | 5/1980 |
| GB | 2082730 | A | 3/1982 |
| JP | 2875865 | B2 | 3/1999 |
| JP | 03276221 | B2 | 4/2002 |
| JP | 2013044358 | A | 3/2013 |
| WO | 2010092979 | A1 | 8/2010 |
| WO | 2011039828 | A1 | 4/2011 |
| WO | 2011039929 | A1 | 4/2011 |
| WO | WO-2013041948 | A1 * | 3/2013 ............. F16L 9/128 |
| WO | 2017123399 | A1 | 7/2017 |

OTHER PUBLICATIONS

ABSTRACT for DE19834772 (A1), Published: Feb. 10, 2000, 1 page.
EPO Official Letter for Application No. 18275118.0, mailed Jun. 29, 2022, 4 pages.
EPO Official Letter for Application No. 18386023.8, mailed Jun. 28, 2022, 3 pages.
EPO Official Letter for Application No. 18386024.6, mailed Jun. 29, 2022, 4 pages.
EPO Official Letter for Application No. 18386025.3, mailed Jun. 29, 2022, 3 pages.
Extended European Search Report for International Application No. 18275115.6 dated Jan. 23, 2019, 9 pages.
Extended European Search Report for International Application No. 18275116.4 dated Feb. 28, 2019, 24 pages.
Extended European Search Report for International Application No. 18275117.2 dated Feb. 27, 2019, 13 pages.
Extended European Search Report for International Application No. 18275118.0 dated Feb. 26, 2019, 7 pages.
Extended European Search Report for International Application No. 18386023.8 dated Feb. 27, 2019, 7 pages.
Extended European Search Report for International Application No. 18386024.6 dated Feb. 27, 2019, 7 pages.
Extended European Search Report for International Application No. 18386025.3 dated Feb. 28, 2019, 13 pages.
Abstract of DE102011077287 (A1), Published: Dec. 13, 2012, 1 Page.
Abstract for CN106015302 (A), Published Oct. 12, 2016, 1 page.
Abstract of CN102278342, Published Dec. 14, 2011, 1 page.
Abstract of CN108268692, published Jul. 10, 2018, 1 page.
First CN Office Action for Application No. 201910725776.2, mailed Dec. 28, 2021, 7 pages.
Machine Transmittal of First CN Office Action for Application No. 201910725776.2, mailed Dec. 28, 2021, 6 pages.
CN Office Action for Application No. 201910725776.2, mailed May 29, 2023, 7 pages.

(56) References Cited

OTHER PUBLICATIONS

Machine Translation for CN2502105Y, Published: Jul. 24, 2002, 4 pages.
DE102008033577A1—Machine Translation—English (Year: 2008), 8 pages.
DE102014004157A1—Machine Translation—English (Year: 2014), 20 pages.

* cited by examiner

COMPOSITE CONNECTORS AND METHODS OF MANUFACTURING THE SAME

FOREIGN PRIORITY

This application claims priority to European Patent Application No. 18386024.6 filed Aug. 10, 2018, the entire contents of which is incorporated herein by reference.

TECHNICAL FIELD

The present disclosure relates to composite (e.g. fiber-reinforced polymer) connectors e.g. for connecting fluid transfer conduits to other structures, and to methods of manufacturing composite (e.g. fiber-reinforced polymer) connectors for fluid transfer conduits.

BACKGROUND

Fluid transfer conduits (e.g. fuel pipes) are typically connected to other structures (e.g. inside aeroplane wings) using one or more connectors. To allow for movement of the fixed structure without inducing large stresses on the fluid transfer conduit itself (e.g. as a wing flexes during flight), such connectors are designed to tolerate a small amount of relative movement between the fluid transfer conduit and the structure whilst still effectively supporting the conduit and sealing the connection. This is often achieved using an elastomeric O-ring, on which the fluid transfer conduit "floats", to seal the connection while allowing a small amount of relative motion.

In many applications, such connectors are required to withstand large circumferential loads (e.g. due to high internal pressures in a fluid transfer conduit) as well as other stresses. To provide the requisite strength while minimising part count connectors are conventionally milled from a single block of metal (usually aluminium). However, this process results in a large amount of material being wasted (a very high so-called buy-to-fly ratio).

Furthermore, fluid transfer conduits are increasingly being constructed from composite materials (e.g. fiber-reinforced polymers), in order to save weight and reduce material costs. However, when used with metallic connectors, composite fluid transfer conduits can experience various problems such as galvanic corrosion and a reduced temperature operating window due to unequal thermal expansion.

More recently therefore, an alternative manufacturing technique has been developed whereby connectors are produced by injection-moulding a resin matrix reinforced with randomly oriented chopped fibers (e.g. glass or carbon fibers). Because injection-moulding is an additive process, it results in less wasted material during manufacture. In addition, chopped-fiber reinforced resin parts are typically lighter than their metal equivalents. However, chopped-fiber reinforcement does not exploit fully the potential strength of reinforcing fibers.

SUMMARY

According to one aspect of the present disclosure, there is provided a connector for a fluid transfer conduit, the connector being made from fiber-reinforced polymer and comprising: a hub portion comprising a tube which extends substantially parallel to a central axis; and a flange portion which extends from the hub portion at an angle to the central axis; wherein the hub portion comprises continuous circumferentially oriented fiber reinforcement; and wherein the connector comprises longitudinally oriented fiber reinforcement which runs continuously from the hub portion into the flange portion.

Because of the high strength-to-weight ratio of continuous fiber-reinforced polymer, the use of continuous fiber-reinforcement can produce a significantly stronger part using the same amount of material compared to randomly-oriented fiber reinforcement or entirely metal parts. Correspondingly, an equally strong part may be produced using less material, thus saving weight.

The connector according to the present disclosure may be produced using additive processes (e.g. resin transfer moulding). This means that there is little material wasted during manufacture, especially compared to machining techniques used to construct conventional metal components. As a result, the cost of manufacturing a connector according to the present disclosure may be less than for an equivalent metal component, even if the underlying material costs are higher (due to less material going to waste).

When continuous fiber-reinforcement is used to make a given component, the orientation of the continuous fibers can be tailored to the direction in which the resulting component will experience loads. Lots of fibers may be oriented in a primary direction of loading, and a lower proportion of fibers may therefore be oriented in directions in which the component experiences little load. This minimises the amount of material wasted when producing a part with a given load capacity.

In this case, continuous circumferentially-oriented fiber in the hub portion provides increased hoop (circumferential) strength, improving the connector's resistance to high hoop loads (e.g. due to high pressure fluid within a fluid transfer conduit positioned within the hub portion). Contrastingly, the longitudinally-oriented fiber reinforcement increases the connector's resistance to axial and bending stresses.

When using randomly-oriented fiber reinforcement, no such tailoring can be performed, and as such the amount of material required to provide the required load resistance is increased. In addition, even when oriented in the direction of loading, chopped fibers inherently exhibit much lower tensile strength than the equivalent amount of continuous fibers. US 2016/0273696 describes an example of an injection-moulded composite that uses chopped fibers.

As mentioned above therefore, the connector of the present disclosure may be produced using less material than conventional connectors, reducing component weight. In many applications, such as the aerospace industry, any weight saving is highly advantageous as it can lead to significant fuel (and thus cost) savings over the lifetime of a part.

In addition to the weight savings provided by the present disclosure, the use of continuous circumferentially-oriented fiber reinforcement within the hub portion of the connector confers other benefits. The continuous circumferential fiber reinforcement stiffens the hub portion and increases its hoop strength (i.e. resistance to internal and external pressures). When fluid at high pressure is passed through the fluid transfer conduit, this stiffness and strength mitigates hoop expansion of the connector when subject to internal pressures, ensuring that a good connection and seal is maintained at all times.

The type of fiber reinforcement used in the connector may be selected based upon the strength and specifications of the finished connector. For example, connectors requiring very high strength may utilise carbon fibers, whilst those requiring high strength but low conductivity may utilise glass fibers.

"Continuous", or "continuously running", fiber-reinforcement is used herein to refer to fiber-reinforcement in which at least some individual constituent filaments have a substantial length, i.e. they are not short "chopped fibers" or discontinuous fibers. In at least some examples, the fiber reinforcement may be considered to be "continuous" when the fibers or filaments have a length on the same scale as the part they are reinforcing. This means that the fiber reinforcement is substantially "continuous" when it extends uninterrupted across a given dimension of a part, such as a length, radius or circumference.

The continuous circumferentially oriented fiber reinforcement in the hub portion preferably comprises at least some individual constituent filaments which extend around a significant fraction of the circumference of the hub portion, e.g. extending 90°, 180°, 270° or more around the hub portion. Further preferably the continuous circumferentially oriented fiber reinforcement in the hub portion preferably comprises at least some individual constituent filaments which extend entirely around the circumference of the hub portion, e.g. at least 360° around the central axis, and even further preferably make several complete loops around the hub portion.

The strength of fiber-reinforced polymers lies in the tensile strength of the reinforcing fibers and as such, an uninterrupted length of continuous fiber wrapping around the hub portion provides a significant improvement in hoop strength and thus pressure resistance when compared to the same amount of chopped fibers, even if all of the chopped fibers were to be aligned in the direction of loading.

Similarly, the longitudinally-oriented fiber-reinforcement preferably comprises fiber-reinforcement in which individual constituent filaments extend a significant fraction of the way along the hub portion and into the flange portion. Some of the individual constituent filaments may travel back and forth between the hub portion and the flange portion several times. As explained above, this confers strength on the joint region between the hub and flange portions.

As mentioned above, an elastomeric O-ring may be used to seal a connection between the connector and a fluid transfer conduit. In such cases the O-ring may be positioned between an outer surface of the fluid transfer conduit and an inner surface of the hub portion (or, conversely, between an inner surface of the conduit and an outer surface of the hub portion), to seal the connection. Optionally, the elastomeric O-ring is seated between a pair of retaining ridges that allow for axial movement between the fluid transfer conduit and the hub portion. The strong and stiff hub portion keeps the O-ring tightly pressed radially between the inner surface of the hub portion and the outer surface of the fluid transfer conduit, ensuring the integrity of the seal.

In addition to the strength benefits, utilising continuous circumferentially oriented fiber reinforcement in the hub portion also enables the hoop coefficient of thermal expansion (hoop CTE) of the hub portion to be closely matched to that of a fluid transfer conduit to which it may be connected.

Fluid transfer conduits for which the connector of the present disclosure is particularly suitable are manufactured from fiber-reinforced polymers comprising a high proportion of circumferentially oriented fibers. This maximises the hoop strength and thus the internal pressure tolerance of the conduit, something which is particularly important in high pressure systems such as fuel pipes, while minimising weight. Because of the high proportion of circumferential fiber in such conduits, when the fluid transfer conduit is subject to a change in temperature (e.g. due to changing ambient conditions), the hoop expansion is dominated by the expansion of the fiber reinforcement. Fibers used as reinforcement in such materials typically have a very low CTE compared to the polymer matrix. For example, glass fibers have a CTE of $1.6$-$2.9 \times 10^{-6}$ K$^{-1}$ and carbon fibers have a CTE which is very close to zero (and may even be negative, e.g. roughly $-0.5 \times 10^{-6}$ K$^{-1}$), while a typical polymer resin has a CTE of $\sim 50 \times 10^{-6}$ K$^{-1}$ (for comparison, aluminium has a CTE of $\sim 23 \times 10^{-6}$ K$^{-1}$). As a result, the hoop thermal expansion of a fiber-reinforced polymer conduit with continuous circumferential fiber is usually low.

Injection-moulded, randomly-oriented chopped fiber-reinforced composites, in comparison, have a CTE which is dominated by the CTE of the resin matrix—i.e. much higher than that of the fiber-reinforced polymer (FRP) conduits described above. Metal connectors also suffer relatively high thermal expansion.

Conventional connectors, therefore, can only be used with fiber-reinforced polymer conduits within a small temperature operating envelope. Differential expansion of the connector and the conduit when subject to temperatures outside this envelope can risk the integrity of the seal and/or the entire connection. Or, the requirement to accommodate such temperature variations and differing CTEs puts design constraints on other elements such as the O-ring. A similar issue arises when a connector has a different stiffness to that of a conduit.

However, as mentioned above, because the hub portion in examples of the present disclosure comprises continuous circumferentially oriented fiber reinforcement, its hoop CTE (and its stiffness) can be more closely matched to that of a given fluid transfer conduit. Matching the CTE allows relative expansion (of the connector relative to the conduit) during use to be minimised over a wider range of temperatures, increasing the applicability and reliability of the part. In some examples therefore, the composition and orientation of fiber-reinforcement within the hub portion is selected such that the hoop CTE of the hub portion matches that of a fluid transfer conduit, formed from FRP, that is connected to the hub portion in use. Additionally or alternatively, the composition and orientation of the fiber reinforcement within the hub portion is selected such that the stiffness of the hub portion substantially matches that of the fluid transfer conduit.

The hub portion is preferably arranged to fit onto or into a fluid transfer conduit, e.g. concentric therewith, with a conduit fitting over an outer diameter of the hub portion or inside an inner diameter of the hub portion. The flange portion is preferably arranged to attach to a further structure and may comprise one or more attachment points thereto.

There is further disclosed a connection system comprising a composite connector as disclosed herein and a fiber-reinforced polymer fluid transfer conduit connected to the hub portion. In one or more examples, the composition and orientation of the fiber reinforcement within the hub portion is selected such that the CTE of the hub portion substantially matches that of the fluid transfer conduit. Additionally or alternatively, the composition and orientation of the fiber reinforcement within the hub portion is selected such that the stiffness of the hub portion substantially matches that of the fluid transfer conduit.

In one or more examples, such matching may be achieved by matching the composition and angle of reinforcing fiber within the hub portion to the composition and angle of reinforcing fiber within the FRP conduit. The continuous circumferential fiber in the hub portion may therefore have substantially the same fiber angle as the circumferential fiber in the conduit. In some examples these fiber angles may differ by no more than 15°, no more than 10° and, preferably, by no more than 5°.

The precise angle at which the longitudinally oriented fiber-reinforcement extends may be limited by the manufacturing techniques used during manufacture, but generally it is preferred to minimise the angle at which the longitudinal fiber extends from the central axis, such that its strength in the direction of the central axis is maximised. The longitudinal fiber typically extends at less than 30° from the central axis; however in preferred examples the longitudinal fiber extends at no more than 20° from the central axis, for example at no more than 15°, no more than 10° or, preferably, even of 5° or less. Dependent on the manufacturing technique used, fiber extending at 0° from the central axis (i.e. axial or substantially axial fiber) is possible.

The continuous circumferentially oriented fiber (i.e. hoop fiber) typically makes an angle of more than 60° to the central axis. In preferred examples the continuous circumferential fiber extends at more than 80° from the central axis, e.g. at least 85° or even at or close to 90°. A high angle maximises the hoop strength provided by the continuous circumferential fiber.

In various examples, the hub portion comprises multiple layers of continuous circumferentially-oriented fiber reinforcement extending at an angle of more than 80° (preferably >85°) to the central axis. In various examples, the continuous circumferentially-oriented fiber reinforcement within the hub portion may comprise layers of high-angle hoop fiber reinforcement and layers of lower angle helical fiber reinforcement, to help tolerate in-service axial forces.

In some examples the hub portion comprises a mixture of layers of longitudinal or helical fiber reinforcement, and continuous circumferential fiber reinforcement, e.g. alternating layers of longitudinal/helical and continuous circumferential fiber reinforcement. This provides the hub portion with uniform strength and mitigates delamination during use. Mixing layers of fiber with different orientations may also prevent large residual stresses being produced during manufacture, which can severely weaken the connector.

It will therefore be appreciated that the hub portion may comprise additional fiber reinforcement oriented at a variety of angles. In some examples, the hub portion further comprises longitudinal or axial fiber reinforcement (i.e. fiber reinforcement which is oriented substantially parallel to the central axis, e.g. close to) 0°, which may increase the resistance of the hub portion to bending loads. Additionally or alternatively, the hub portion may comprise helical fiber reinforcement oriented at roughly 45° to the central axis (i.e. midway between the axial and circumferential directions). This can help with CTE matching and/or may aid the detection of barely-visible impact damage (BVID) to the hub portion.

The hub portion preferably comprises a tube with a substantially circular cross section (i.e. the hub section comprises a cylinder). A circular cross-section maximises the hoop strength of the hub portion and can by easier to manufacture. In some examples, however, the tube may have a rectangular, other polygonal or an elliptical cross section, amongst other possible shapes. Preferably the hub section has a cross section which matches that of a fluid transfer conduit to which it is suitable for connecting. In a connection system as disclosed above, the hub portion may have substantially the same cross-section as the fluid transfer conduit.

As mentioned above, the longitudinally oriented fiber reinforcement which runs continuously from the hub portion into the flange portion confers strength to the connector at the point at which the hub portion is connected to the flange portion. This increases the ability of the connector to resist bending loads (e.g. due to wing flex and inertial loads during flight) and mitigates the chances of damage or failures in a potential region of high stress. In particular, as the longitudinal fibers extend across the intersection of the hub and the flange, i.e. from the hub portion, round the corner into the flange portion, the connector benefits from increased axial load strength.

In preferred examples there is little or no circumferentially oriented fiber reinforcement present in the flange portion. The Applicant has recognised that the flange portion is less likely to experience hoop stresses than the hub portion and as such circumferentially oriented fiber reinforcement in the flange section is unnecessary and adds weight whilst providing little structural benefit. In addition, using mostly or solely longitudinal fiber reinforcement in the flange section may aid manufacture, as explained in greater detail below.

The flange portion may comprise at least one through-hole which may be used along with a suitable fastening means (e.g. a nut and bolt) to secure the connector to a structure. The through-hole may be formed by drilling through a completed connector, but this results in constituent fibers of the continuous fiber reinforcement being severed, which can reduce the strength of the flange portion and thus the efficacy of the connector. In some examples, therefore, the through-hole is defined by unbroken fiber reinforcement, i.e. wherein fibers divert around the perimeter of the hole and may re-align on the other side of the hole.

The angle to the central axis at which the flange portion extends is preferably greater than 45°, and is preferably substantially perpendicular to the hub portion, i.e. at 90°, to enable secure attachment to a surface normal to the central axis. In some examples the entire flange portion may not extend at the same angle to the central axis but may be shaped to accommodate the shape of a particular structure.

The fiber-reinforced polymer from which the connector is made preferably comprises a thermosetting polymer, such as epoxy or phenolic resins. Thermosetting polymers provide high strength, are easy to work with and can be much cheaper than alternatives such as thermoplastic polymers. Thermoplastic resins are also often more viscous than thermoset resins, making them more difficult to work with.

Fluid transfer conduits for which the connector of the present disclosure is particularly suitable are often manufactured using thermosetting polymers, because these are highly suited to the filament winding processes typically employed to manufacture such conduits.

The polymer of the connector may optionally include one or more non-fiber material additives. For example, the non-reinforced polymer may include small quantities of one or more non-fiber material additives intended to alter one or more non-structural properties of the polymer, such as viscosity, thermal or electrical conductivity, radiation sensitivity, colour, fire or chemical resistance etc.

For example, in aircraft fuel systems, it is important to control the conductivity of the composite connector. Ideally the fuel system (i.e. comprising pipes and connectors) is insulating enough to avoid becoming the preferred path for lighting conduction, whilst conductive enough to avoid static build-up due to fuel flow. Adding a particular amount of a conductive additive (e.g. carbon black, carbon nanotubes or graphene) to the polymer during manufacture allows the desired level of conductivity to be achieved. Such an additive is ideally present throughout the component (i.e. in both the flange portion and the hub portion), although this is not essential.

To control the conductivity of a fuel system, it may not be necessary to control the conductivity of both the pipe(s) and the connector(s). It may be sufficient, in at least some cases, for the conductivity of only the pipe(s) to be controlled (e.g. by adding a certain concentration of carbon black during pipe manufacture). The connector then simply needs to comprise a minimum level of conductivity for the desired overall conductivity to be achieved. Alternatively, the conductivity of the connector(s) may be controlled and used with a pipe with a minimum conductivity.

The type of fiber reinforcement may be chosen based upon one or more desired properties of the finished composite connector. For example, composite connectors requiring very high strength may utilise carbon fibers, whilst those requiring high strength but low conductivity may utilise glass fibers.

The present disclosure extends to a method of manufacturing a connector for a fluid transfer conduit, the method comprising: providing a first mould section comprising a hub-moulding portion which extends substantially parallel to a central axis and a flange-moulding portion which extends from the hub-moulding portion at an angle to the central axis; introducing fiber-reinforcement to the first mould section such that continuous circumferentially-oriented fiber-reinforcement lies in the hub-moulding portion, and continuous longitudinally-oriented fiber reinforcement extends from the hub-moulding portion into the flange-moulding portion; applying a second mould section over the first mould section to form a complete mould in which the fiber-reinforcement is confined; introducing polymer to the complete mould such that it permeates through the fiber-reinforcement to form a fiber-reinforced polymer connector; and extracting the connector from the mould.

As mentioned above, in some examples the connector comprises a thermosetting polymer. Thermosetting polymers are particularly suited for mould-based techniques as they typically have lower viscosity than alternatives (e.g. thermoplastic polymers). A lower viscosity can enable more uniform distribution of the polymer around the mould and aid permeation of the polymer through the fiber-reinforcement, leading to a stronger and more reliable connector.

In examples featuring a thermosetting polymer, the method may comprise curing the connector after the polymer resin has been introduced. Preferably the connector is cured whilst still in the mould, in which case heat may be applied to the mould to expedite the curing process. In other examples the connector may be only partially cured in the mould, and the curing process completed elsewhere, freeing up the mould for other use.

The fiber introduced to the mould may be dry fiber (as opposed to wet fibers which are pre-coated with resin ("prepreg") or which have been drawn through a resin bath).

In some examples the method may comprise applying a tackifier to the dry fiber-reinforcement. The tackifier may be applied before the fiber-reinforcement is introduced to the first mould section although it may additionally or alternatively be applied during or after the fiber-reinforcement has been introduced to the first mould section. The tackifier serves to bind the fiber-reinforcement together and hold it in position before it is confined (and thus held in place) by the second mould section. When cured, the tackifier may also serve to improve the fracture toughness of the polymer in the finished connector, improving its resistance to impact and increasing its BVID threshold.

This is particularly beneficial in examples where the angle at which the flange-moulding portion extends is large (e.g. 45° or more), as the continuous longitudinally-oriented fiber reinforcement extending from the hub-moulding portion into the flange-moulding portion may resist being bent at the junction between the hub-moulding portion and the flange-moulding portion. In other words the fiber reinforcement may attempt to "spring" back into a linear shape when introduced to the mould, but the tackifier serves to temporarily "fix" the shape of the dry-fiber reinforcement such that it is less prone to springing out of position.

The tackifier may comprise a spray tackifier, such as an epoxy dispersed in a solvent (e.g. acetone). The tackifier may comprise, for example, a DGEBA/PA6 particles solution.

The fiber-reinforcement may comprise a woven tube, or "sock" (e.g. woven from dry fiber), which is pushed over the first mould section. The woven tube may comprise continuous longitudinally, helically and circumferentially-oriented fiber reinforcement. Preferably, however, an end portion of the woven tube comprises no continuous circumferentially-oriented fiber reinforcement. Continuous circumferentially-oriented fiber may, however, be overwound onto the woven tube away from the end portion. As mentioned above, the flange portion of the finished connector preferably comprises no continuous circumferentially-oriented fiber reinforcement. In such examples the flange portion of the finished connector may correspond to the end portion of the woven tube. It will be appreciated that this can aid manufacture, as such an end portion may be easily pushed over the flange-moulding portion during manufacture without wrinkling or buckling.

The method may further comprise applying a vacuum to the mould to draw the polymer resin through the mould. This can increase the speed at which the polymer permeates into the fiber reinforcement and may also improve thoroughness with which the polymer penetrates into the fiber reinforcement, improving the uniformity and thus the strength and reliability of the finished connector.

Additionally or alternatively, the polymer resin material may be introduced under pressure, i.e. actively pumped into the mould. Similarly to applying a vacuum, this can speed the process up and/or improve the uniformity of the finished component.

The first mould section is a rigid structure defining the hub-moulding and flange moulding portions, for example constructed from metal (e.g. steel). The second mould section may also comprise a rigid structure, with a complementary shape to the first mould section. In such examples the method may comprise a resin transfer moulding (RTM) process. An RTM process provides a high quality tool-surface finish on all external surfaces of the component. An all-metallic mould can also aid the even application of heat during curing, as explained above. In such examples, the polymer introduced into the mould preferably comprises a thermosetting polymer.

The method may, however, also be implemented with other mould-based resin infusion techniques such as those in which the rigid first mould section is used in conjunction with a non-rigid (i.e. conforming) second mould section. In such examples the second mould structure may comprise a vacuum bag (as in vacuum infusion processes such as SCRIMP, RIFT and VARTM). Using only one rigid mould section can reduce equipment costs but results in only one surface of the finished connector having a high quality finish.

Alternatively, in some examples the method herein may comprise an injection moulding process, in which the polymer introduced into the mould comprises a thermoplastic polymer.

The flange-moulding portion may comprise at least one raised boss, around which the fiber-reinforcement is diverted, so as to produce at least one through-hole in the finished connector which is defined by continuous (unbroken) fiber reinforcement. As explained above, such a through-hole can provide increased strength compared to alternatives, such as those formed by drilling through a finished connector.

The present disclosure refers throughout to a composite connector comprising a hub portion and a flange portion. It will be appreciated that a given connector may comprise more than one flange portion per hub portion, or more than one hub portion per flange portion. Any single-ended, double-ended or multiple port connector may be included within this disclosure.

Features of any example described herein may, wherever appropriate, be applied to any other example described herein. Where reference is made to different examples or sets of examples, it should be understood that these are not necessarily distinct but may overlap.

DETAILED DESCRIPTION

DETAILED DESCRIPTION

Figure 1:
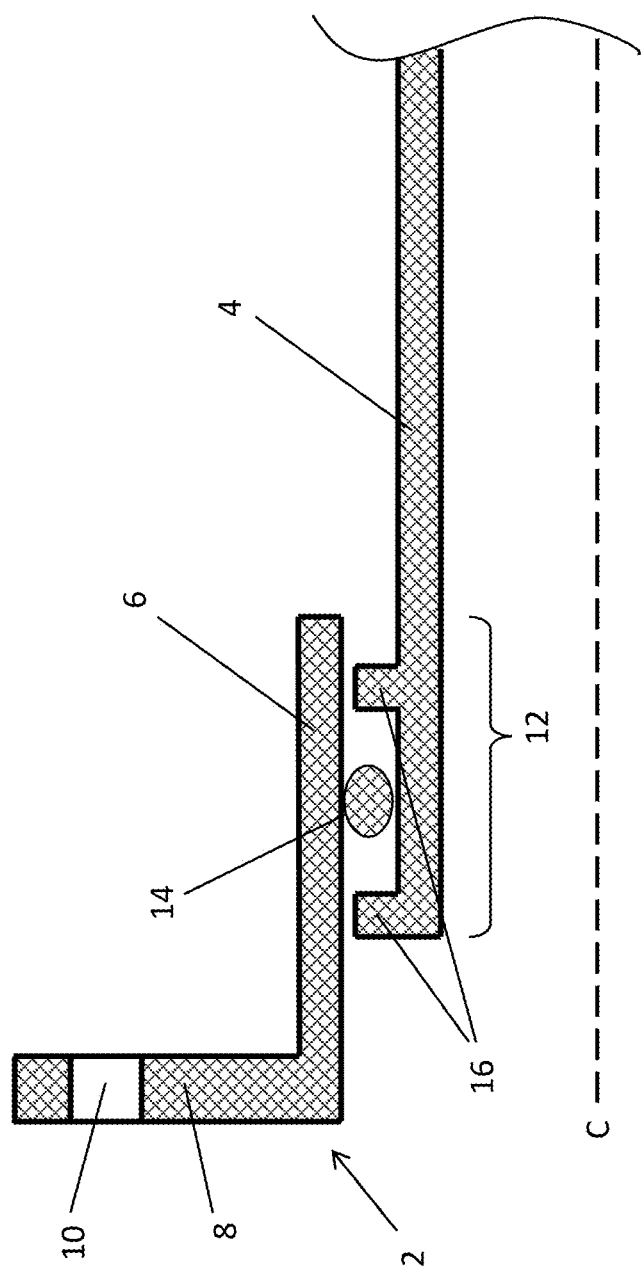
FIG. 1 is a cross sectional view of the connection between a connector and a fluid transfer conduit.

FIG. 1 shows the interface between a connector 2 and a cylindrical fluid transfer conduit 4 that extends parallel to a central axis C. The connector 2 comprises a cylindrical hub portion 6, which also extends parallel to the central axis C, and a flange portion 8, which extends from an end of the hub portion 6 in a direction perpendicular to the central axis C. The flange portion 8 further comprises a through-hole 10, by which the connector 2 may be secured to another structure, e.g. an aircraft wing.

The hub portion 6 encloses a connection portion 12 of the fluid transfer conduit 4. An elastomeric O-ring 14 is located between the hub portion 6 and the connection portion 12, retained between an inner wall of the hub portion 6 and an outer wall of the fluid transfer conduit 4. The O-ring 14 is confined by two retaining ridges 16 which extend radially outwards from the connection portion 10 of the fluid transfer conduit 4.

The O-ring 14 provides a seal between the connector 2 and the conduit 4, such that fluid may flow along the conduit 4 and into the connector 2 without escaping. In addition, the configuration of O-ring 14 between the connection portion 12 and the hub portion 6 allows the fluid transfer conduit 4 to move a small distance in the direction of the central axis C relative to the connector 2 without compromising the seal. This enables a structure to which the connector 2 is secured to move or flex a small amount without imparting large stresses on the conduit 4 (as would be the case if the connector 2 was rigidly attached to the conduit 4). Instead, the conduit 4 "floats" on the O-ring 14 such that it can slide longitudinally a small distance without breaking the seal. For example, the structure to which the connector 2 is attached may be an aircraft wing rib, which is designed to move a small amount during flight as the wing flexes due to aerodynamic load and/or temperature fluctuations. The fluid transfer conduit 4 may comprise a fuel pipe located within the wing which must therefore be able to cope with the wing flex during flight.

Figure 2:
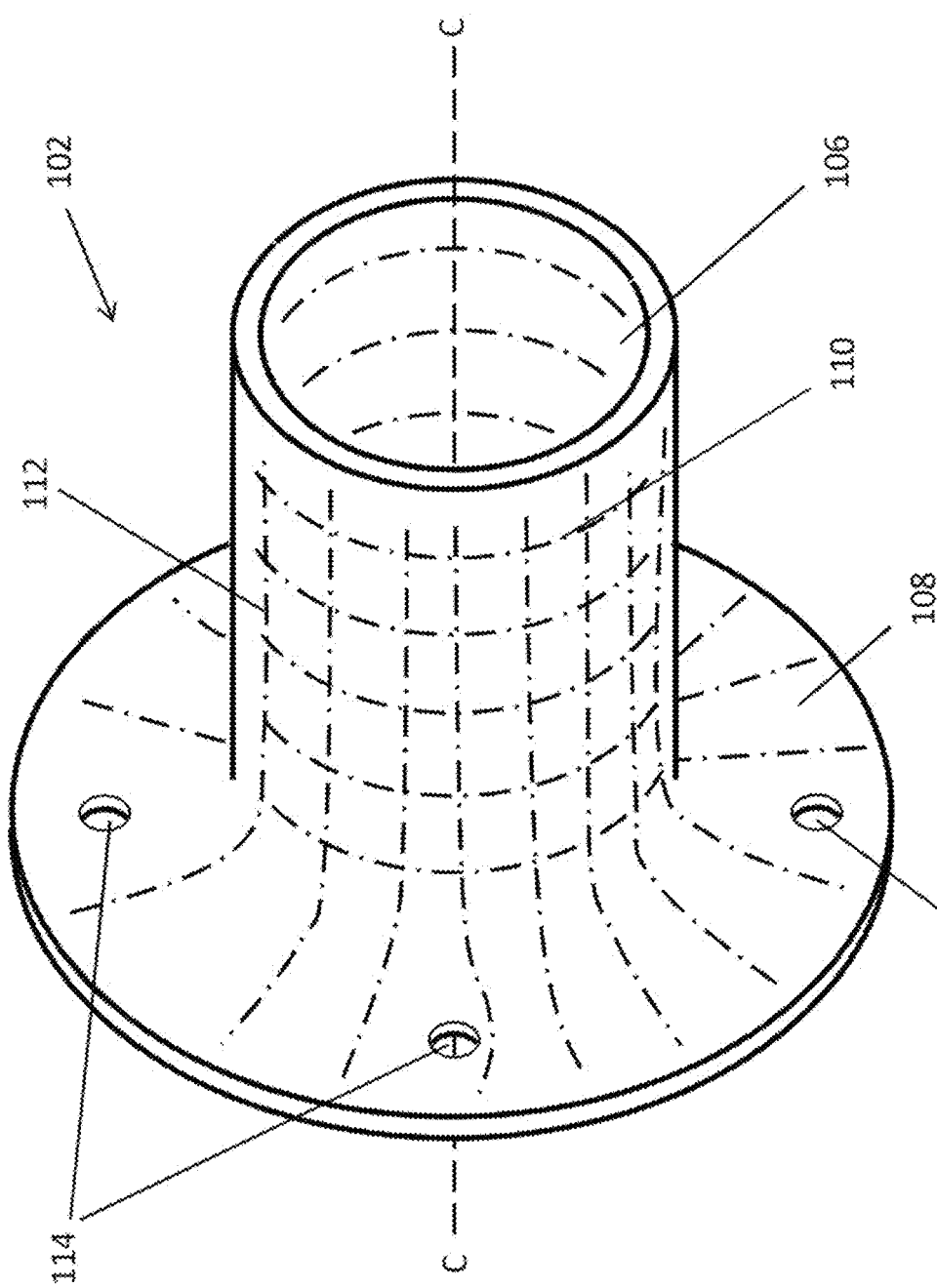
FIG. 2 shows a connector for a fluid transfer conduit according to an example of the present disclosure.

FIG. 2 is a perspective view of a connector 102 according to an example of the present disclosure. The connector 102 comprises a cylindrical hub portion 106 which extends parallel to a central axis C and a flange portion 108 which extends perpendicularly from an end of the hub portion 106.

The flange portion 108 comprises an annular, disc-like portion extending perpendicular to the central axis C.

The hub portion 106 comprises a thermoset resin matrix reinforced with both hoop (circumferential) fiber 110 and axial (longitudinal) fiber 112. The flange portion 108 contains no hoop-wound fiber but does comprise axial fiber 112 which extends continuously from the hub portion 106 into the flange portion 108.

The hoop fiber 110 provides the hub portion 106 with high hoop strength such that the hub portion can resist large internal pressures. It also makes the hub portion 106 very stiff, such that large internal pressures cause negligible hoop expansion.

The axial fiber 112 that runs continuously from the hub portion 106 into the flange portion 108 strengthens the joint between the hub portion 106 and the flange portion 108, increasing the resistance of the connector 102 to bending loads. The flange portion 108 does not contain any hoop-wound fiber, which saves weight and can aid manufacture.

The flange portion 108 comprises four through holes 114 (although only three are visible in the perspective view of FIG. 2) by which the connector 102 can be secured to another structure.

Figure 3:
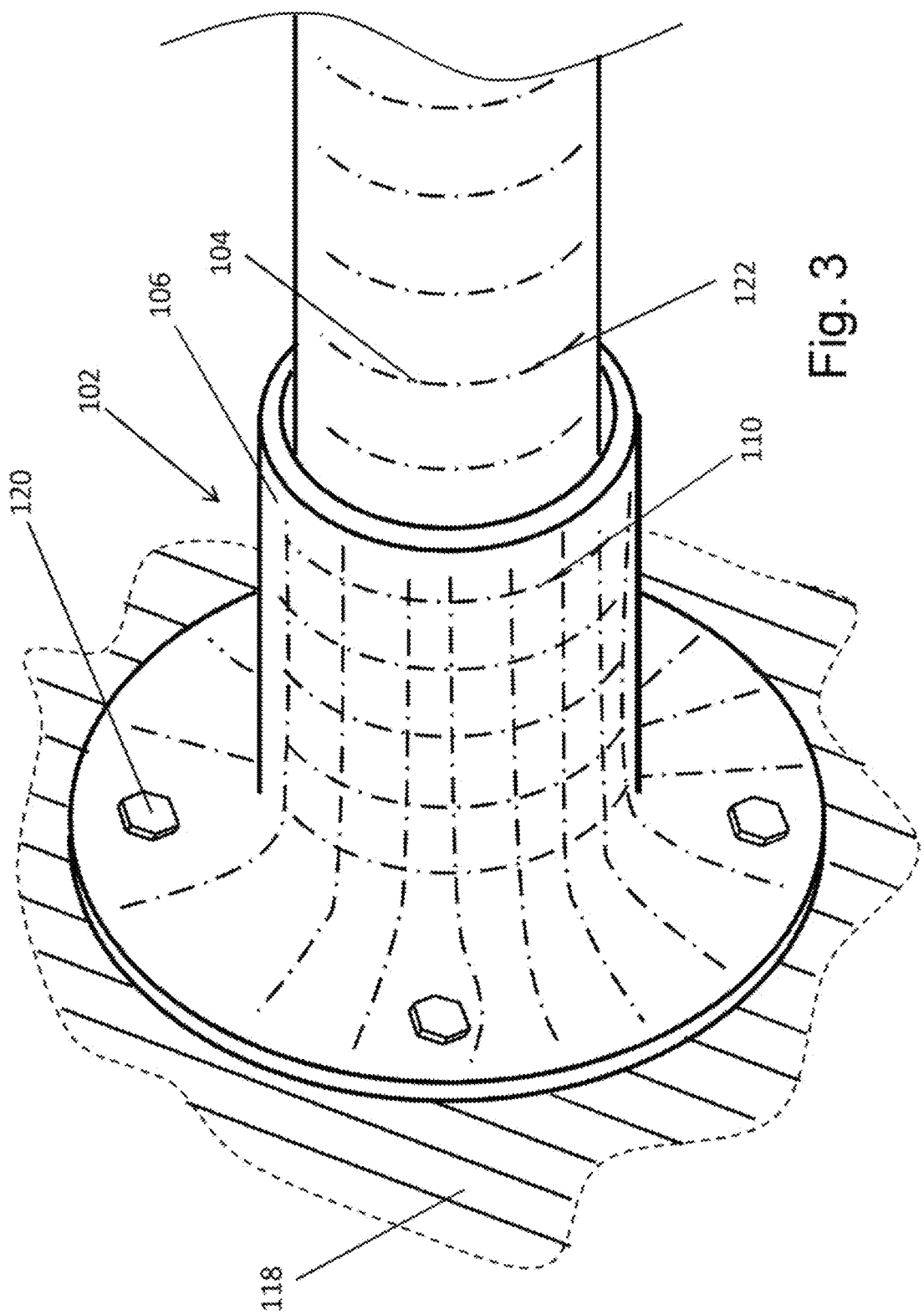
FIG. 3 shows the connector for a fluid transfer conduit with a fluid transfer conduit installed therein.

FIG. 3 shows a perspective view of the connector 102 in use, connecting one end of a composite fuel pipe 104 to a wing rib 118 of an aircraft. The composite fuel pipe 104 extends into the hub portion 106 and floats inside on an O-ring (not shown), which also serves to seal the connection. The connector 102 is secured rigidly to the rib 118 via four bolts 120 (only three are visible in this Figure). Although not shown in this Figure, a second, similar, connector may connect the other end of the fuel pipe 104 to a second wing rib of the aircraft.

During flight, due to aerodynamic forces and/or temperature based expansion/contraction, the wing rib 118 (and thus the connector 102) moves relative to the fuel pipe 104. However, because the composite fuel pipe 104 floats on an O-ring, it is able to move relative to the connector 102 without compromising the connection.

The composite fuel pipe 104 is constructed from fiber-reinforced polymer, and comprises a high proportion of continuous circumferentially oriented (hoop) fiber reinforcement 122. This provides the fuel pipe 104 with high hoop strength. In addition, the high proportion of hoop fiber-reinforcement 122 in the fuel pipe 104 means that its hoop coefficient of thermal expansion (hoop CTE) is dominated by that of the fiber-reinforcement 122, rather than the polymer matrix. The polymer from which the fuel pipe 104 is constructed is a thermoset polymer.

As mentioned above, the hub portion 106 also comprises a high proportion of hoop fiber-reinforcement 110 and a thermoset polymer. As such, the hoop CTE of the hub portion 106 is also dominated by that of the fiber-reinforcement 110. As a result, the hoop CTEs of the pipe 104 and the hub portion 106 are substantially equal and any thermal expansion or contraction of the pipe 104 is matched by the hub portion 106. This ensures that the connection between the connector 102 and the pipe 104 remains intact (i.e. the pressure on the O-ring remains constant) over a wide temperature range (typically −55° C. to 80° C.).

The axial CTE of the hub portion 106 and composite pipe 104 may not be matched but, as highlighted above, a small amount of axial differential movement (e.g. caused by greater axial thermal expansion of the pipe 104 than the hub portion 106) may be tolerated without any impact on the integrity of the O-ring seal.

A method of manufacturing a composite connector according to the present disclosure will now be described with reference to FIGS. 4-8.

Figure 4:
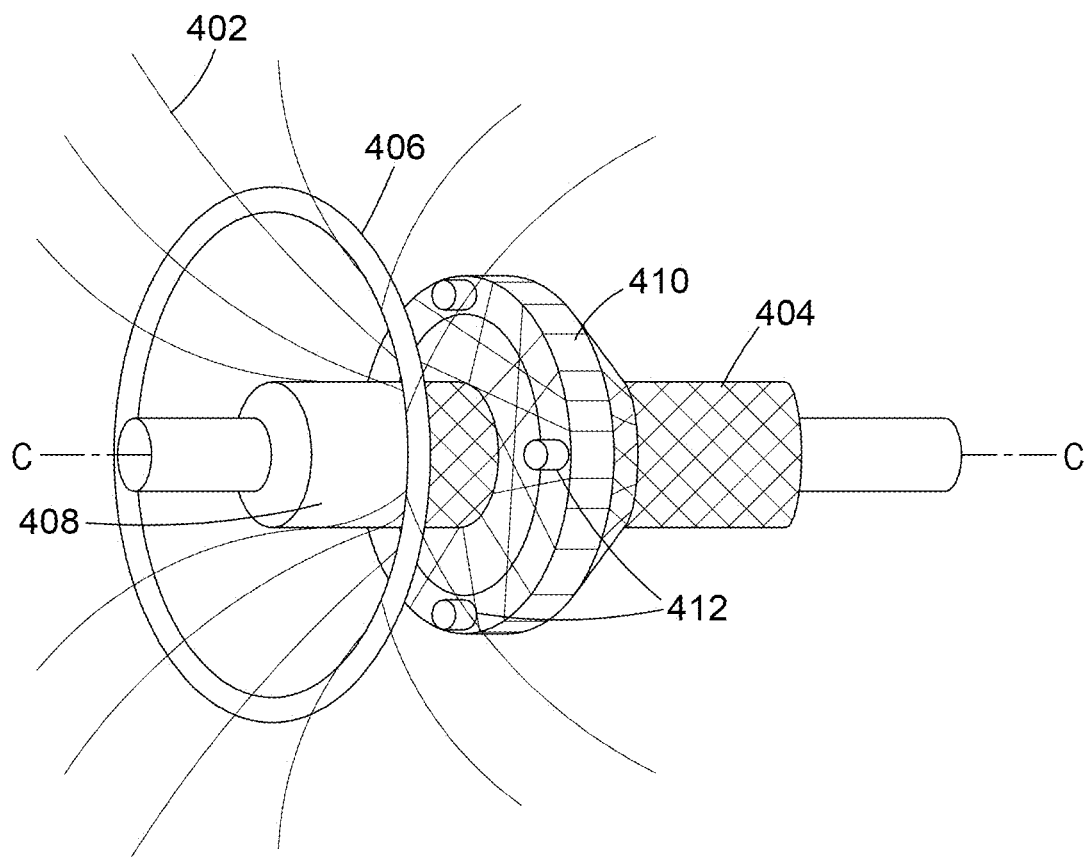
FIGS. 4-8 show various steps in a method of manufacturing a fluid transfer conduit according to an example of the present disclosure.
Figure 5:
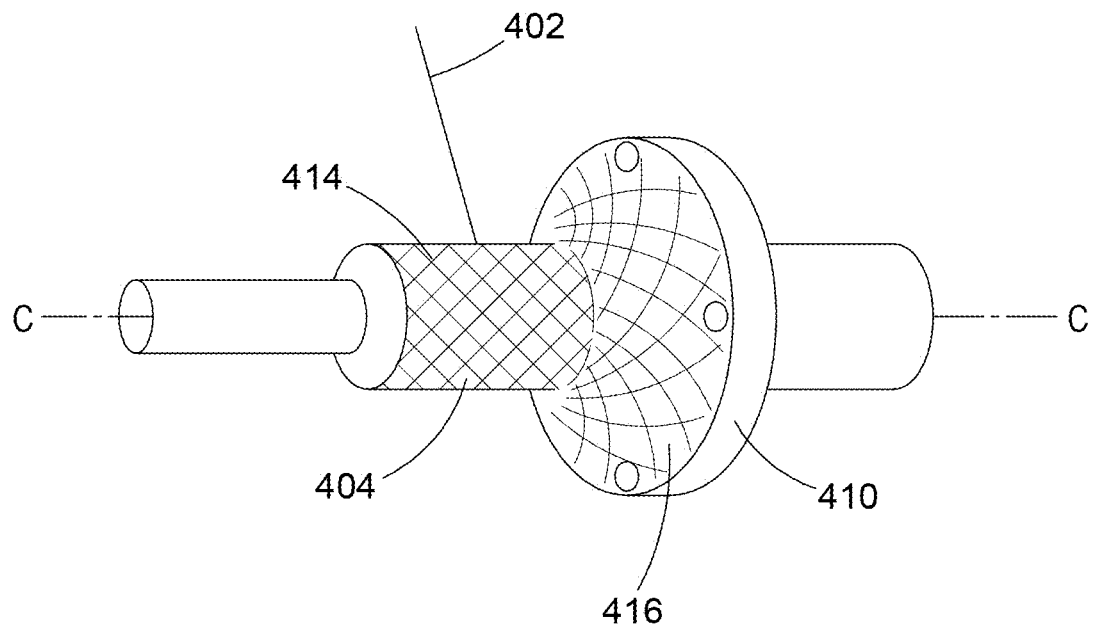
Figure 6:
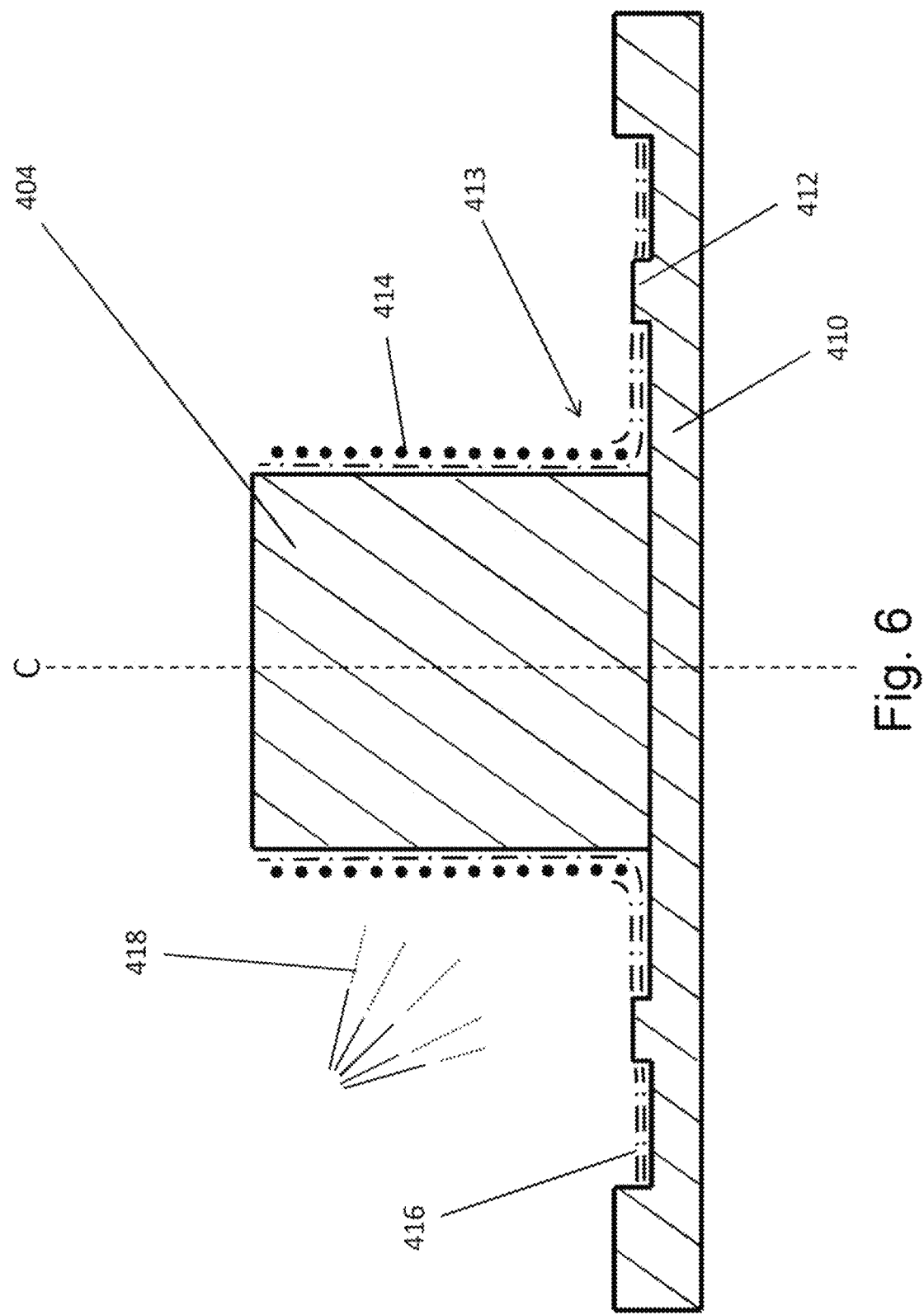

FIG. 4 shows how a woven fiber-reinforcement tube or "sock" may be manufactured. Multiple tows of dry fiber reinforcement 402 are woven onto a cylindrical mandrel 404 using a braiding tool (not shown) in conjunction with a braiding guide 406. The mandrel 404 extends along a central axis C and the woven fiber reinforcement 402 make an angle of roughly ±45° to the central axis.

The mandrel 404 comprises a central portion 408 around which a male mould tool 410 is positioned. The male mould tool 410 comprises four raised bosses 412 (although only three are shown in FIG. 4) that extend parallel to the mandrel 404. The fiber reinforcement 402 extends over the male mould tool 410 and around the raised bosses 412 to form a woven sock 413 (also shown in FIGS. 5 and 6) with a tubular hub-forming portion 414 around the central portion 408 and an annular flange-forming portion 416 which extends radially outwards to the male mould tool 410. The flange-forming portion 416 comprises four holes corresponding to the four bosses 412. These will form bolt holes in the finished connector. If required, metallic inserts (not shown) may be pressed into these holes to provide a bearing surface.

Additional fiber reinforcement 402 is then filament wound at a high angle (e.g. >85°) to the central axis C (i.e. in the hoop direction) over the hub-forming portion 414. This high angle reinforcement 402 provides the resultant hub portion with high hoop strength and can help to match the CTE of the connector with that of a fluid transfer conduit.

The woven sock 413, along with the mandrel 404 and the male mould tool 410 are then removed from the braiding tool. A tackifier 418 may be added (e.g. by spraying) to help hold the fiber reinforcement 402 of the woven sock 413 in position.

Figure 7:
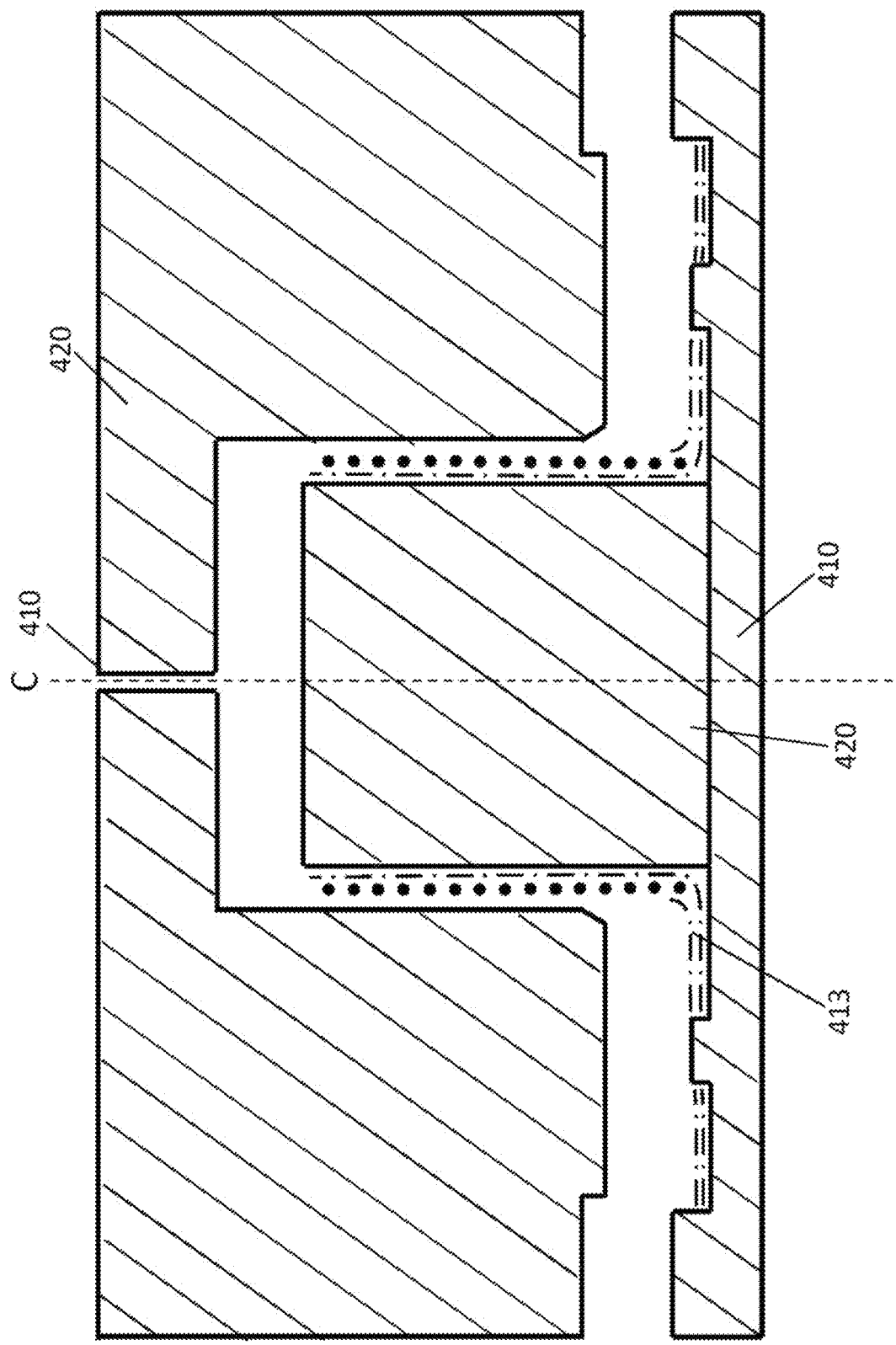
Figure 8:
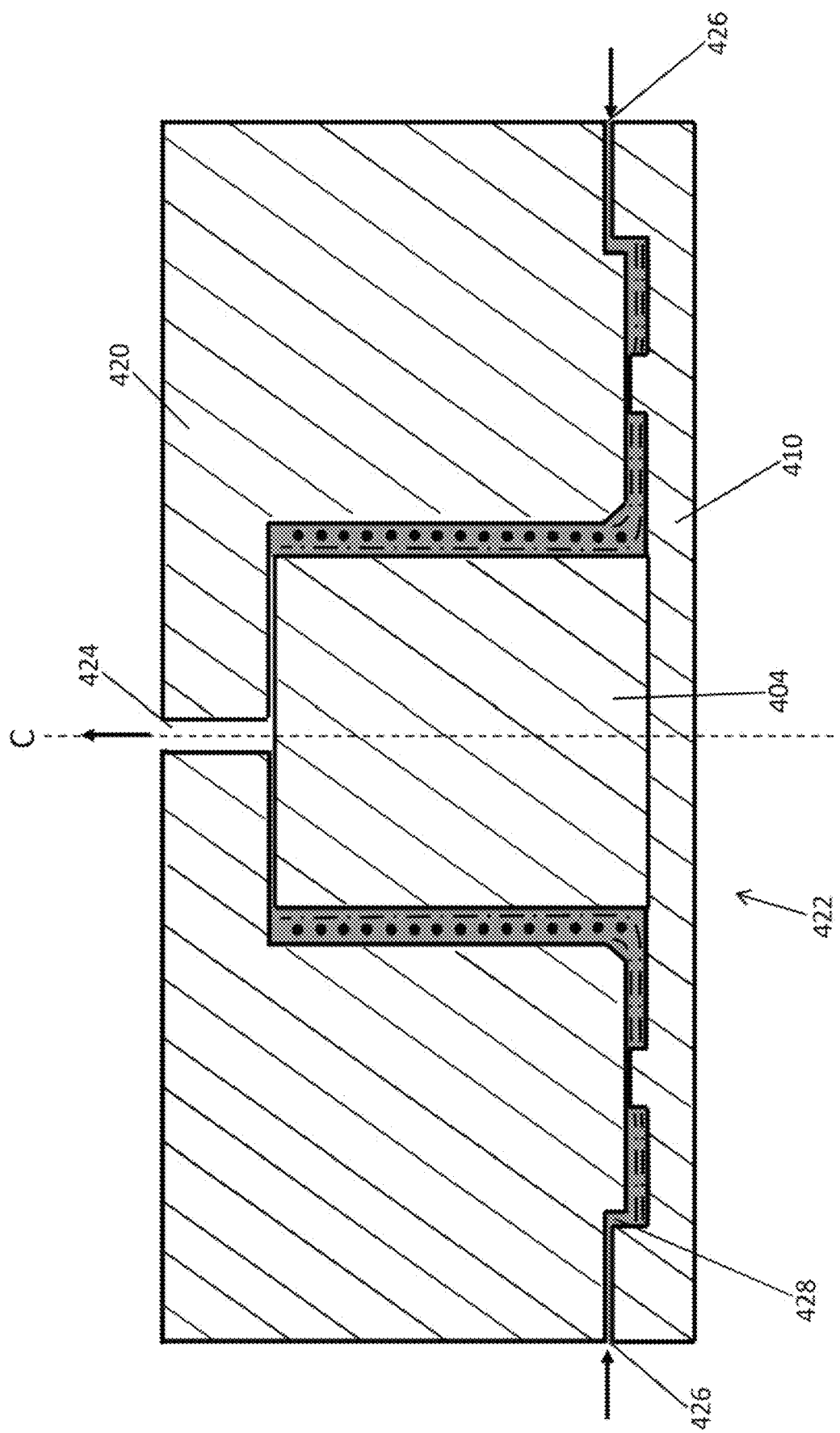

As shown in FIGS. 7 and 8, a female mould tool 420 is then placed over the mandrel 404 and the male mould tool 410 to form a complete mould 422 in which the woven sock 413 is enclosed. The mould 422 comprises an outlet 424 and two inlets 426 (additional, or fewer, outlets and inlets, although not shown in FIG. 7, may of course be used).

A vacuum infusion process is then utilised to form the woven sock 413 into a composite connector. A vacuum is applied to the outlet 424 and a thermosetting polymer 428 is injected into the mould 422 through the inlets 426. The polymer 428 is drawn through the mould 422 by the vacuum such that it permeates into the fiber reinforcement 402 of the woven sock 413. The polymer 428 is preferably a snap-cure polymer, such that curing times may be minimised.

Once the polymer 428 has fully infiltrated the woven sock 413, heat is applied to the mould 422 to cure the polymer 428 to form a composite connector. The mould 422 is then disassembled (i.e. by removing the female mould tool 420) to allow the composite connector to be extracted.

The invention claimed is:

1. A composite connector for a fluid transfer conduit comprising:
   a hub portion comprising a tube which extends substantially parallel to a central axis; and
   a flange portion which extends from the hub portion at an angle to the central axis;
   wherein the hub portion comprises continuous circumferentially-oriented fiber reinforcement;
   wherein the connector comprises longitudinally-oriented fiber reinforcement which runs continuously from the hub portion into the flange portion; and
   wherein the flange portion comprises at least one through-hole defined by unbroken fibre reinforcement.

2. The connector as claimed in claim 1, wherein there is little or no circumferentially oriented fiber reinforcement present in the flange portion.

3. The connector as claimed in claim 1, wherein the continuous circumferentially-oriented fiber reinforcement in the hub portion extends at more than 80° from the central axis.

4. The connector as claimed in claim 1, comprising a thermosetting polymer matrix.

5. The connector as claimed in claim 1, wherein the hub portion further comprises additional longitudinal or helical fiber reinforcement.

6. The connector as claimed in claim 1, further comprising at least one non-fiber material additive.

7. A connection system comprising:
   the composite connector as claimed in claim 1; and
   a fiber-reinforced polymer fluid transfer conduit connected to the hub portion,
   wherein the composition and orientation of the fiber reinforcement within the hub portion is selected such that the coefficient of thermal expansion or the stiffness of the hub portion substantially matches that of the fluid transfer conduit.

8. The connection system of claim 7, comprising an elastomeric O-ring that seals a connection between the connector and the fluid transfer conduit.

9. The connection system of claim 8, wherein the elastomeric O-ring is seated between a pair of retaining ridges on the hub portion or on the fluid transfer conduit.

10. The connection system of claim 8, wherein:
    the fluid transfer conduit comprises a first proportion of continuous circumferentially oriented fiber reinforcement;
    the hub portion of the composite connector comprises a second proportion of continuous circumferentially oriented fiber reinforcement; and
    the first and second proportions are selected such that a hoop coefficient of thermal expansion of the fluid transfer conduit matches a hoop coefficient of thermal expansion of the hub portion.

11. The connection system of claim 8, wherein:
    the fluid transfer conduit comprises continuous fiber reinforcement extending at a first fiber angle to the central axis;

the continuous circumferentially-oriented fiber reinforcement in the hub portion extends at a second fiber angle to the central axis; and the first and second fiber angles differ by no more than 15°.

* * * * *